United States Patent

Lohse et al.

[15] 3,674,746

[45] July 4, 1972

[54] HIGH CRYSTALLINE TRANSITION TEMPERATURE ELASTOMERS FROM POLYESTER POLYURETHANES

[72] Inventors: Friedrich Lohse, Allschwil; Rolf Schmid, Reinach/Bl; Willy Fisch, Binningen; Hans Batzer, Arlesheim, all of Switzerland

[73] Assignee: Ciba Limited, Basel, Switzerland

[22] Filed: Dec. 2, 1969

[21] Appl. No.: 881,628

[30] Foreign Application Priority Data

Dec. 9, 1968 Switzerland .....................18354/68

[52] U.S. Cl..............260/75 NP, 260/2.5 AV, 260/75 NT, 260/75 NK, 260/858, 260/DIG. 35
[51] Int. Cl..............C08g 22/10, C08g 22/16, C08g 41/04
[58] Field of Search.............260/75 NP, 75 NH, 77.5 AM, 260/858, 75 NT

[56] References Cited

UNITED STATES PATENTS

| | | | |
|---|---|---|---|
| 2,621,166 | 12/1952 | Schmidt et al. | 260/75 |
| 2,729,618 | 1/1956 | Mueller et al. | 260/75 |
| 2,741,800 | 4/1956 | Brockway | 18/58 |
| 2,753,319 | 7/1956 | Brockway | 260/30.6 |
| 2,779,689 | 1/1957 | Reis | 117/104 |
| 2,811,493 | 10/1957 | Simon et al. | 260/2.5 |
| 2,888,432 | 5/1959 | Fauser | 260/45.4 |
| 2,929,800 | 3/1960 | Hill | 260/77.5 |
| 2,953,539 | 9/1960 | Kiplinger et al. | 260/31.6 |
| 2,981,719 | 4/1961 | Muehlhausen et al. | 260/75 |
| 3,248,373 | 4/1966 | Barringer | 260/77.5 |
| 3,391,054 | 7/1968 | Lems et al. | 161/186 |
| 3,473,951 | 10/1969 | De Rossi et al. | 117/72 |
| 3,493,634 | 2/1970 | Kolycheck | 260/858 |
| 3,352,830 | 11/1967 | Schmitt et al. | 260/77.5 |

OTHER PUBLICATIONS

Lenz–Organic Chemistry of Synthetic High Polymers, Interscience, New York, (1967) pages 5– 19. Call No. QD281.P6.L4

*Primary Examiner*—Donald E. Czaja
*Assistant Examiner*—H. S. Cocker
*Attorney*—Harry Goldsmith, Joseph G. Kolodny and Mario A. Monaco

[57] ABSTRACT

Manufacture of high molecular, crosslinked crystalline polyadducts possessing urethane groups, from (a) linear succinic acid butane-1,4-diol polyesters possessing terminal hydroxyl groups and having an average molecular size of about 750 to about 5300, (b) as crosslinking agents, polyhydroxyl compounds containing at least 3 hydroxyl groups, preferably those having a hydroxyl equivalent weight of at most 300, e.g., 3-hydroxymethyl-2,4-dihydroxypentane, and (c) diisocyanates, for example hexamethylene-diisocyanate 3,5,5-trimethyl-3-(isocyanato-methyl)-cyclohexane-isocyanate-(1), 2,4-toluylene-diisocyanate or 2,6-toluylene-diisocyanate, with 0.9 to 1.1 equivalents of isocyanate groups of the isocyanate being employed in each case per 1 equivalent of the total amount of hydroxyl groups of the two components (a) and (b).

11 Claims, No Drawings

HIGH CRYSTALLINE TRANSITION TEMPERATURE ELASTOMERS FROM POLYESTER POLYURETHANES

It is known that it is possible to obtain crosslinked polyurethane plastics by polyaddition of dihydric long-chain alcohols to diisocyanates in the presence of trihydric alcohols as crosslinking agents. The incorporation of long-chain diols, for example polyether-glycols or long-chain polyesters containing alcohol end groups, leads to moulded materials of high flexibility and toughness. Polyurethane plastics with similar favorable technical properties can be obtained if instead of dihydric long-chain alcohols containing admixed tris-hydroxy compounds, branched long-chain polyether-glycols are employed, such as are for example obtained by addition of ethylene oxide or propylene oxide to triols, such as glycerine or trimethylolpropane. Instead of using such branched polyether glycols, good success can also be achieved by using slightly branched polyesters containing alcohol end groups, which are obtainable from dicarboxylic acids and diols with the addition of small amounts of a tris-hydroxy compound.

To the extent that crystalline polyurethane plastic products are obtained from diisocyanates and long-chain dihydroxy or trihydroxy compounds in this known polyadduct formation, the products possess relatively low crystallization transition temperatures (CTT). The CTT of the fully cured mechanically high-grade moulded materials is in all cases below 60° – 80°C. Above this temperature the moulded materials show rubbery-elastic behavior and exhibit only low strength values, which is very disadvantageous for most applications.

It has now been found that by polyaddition of certain linear polyesters, possessing terminal hydroxyl groups, from succinic acid and butane-1,4-diol, to diisocyanates, with the addition of polyhydroxy compounds containing at least three hydroxyl groups and acting as crosslinking agents, crystalline polyurethane plastic products are obtained which show an extremely high work required for a change of shape (deformation energy). Furthermore they possess, especially after prior stretching, high mechanical strength, good flexibility and elastic behavior.

Above all, the new polyadducts as a rule show a surprisingly high CTT of above 80°C and frequently above 95°C in comparison to polyadducts which are derived from the same diisocyanate and other polyesters, containing terminal hydroxyl groups, from the same homologous series (for example, polyesters from succinic acid and ethylene glycol or hexanediol or from adipic acid and butanediol).

The polyesters from succinic acid and 1,4-butanediol, possessing terminal hydroxyl groups, which are used for the polyaddition, must be relatively long-chain, that is to say the recurring structural element of formula

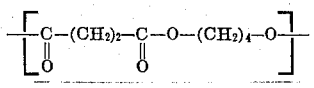

must occur at least four times on average and at most 30 times on average in the chain, corresponding to an average molecular size of the polyester of about 750 to about 5,300. The stoichiometric ratio of the reagents must furthermore be so chosen that per 1 equivalent of hydroxyl group of the linear polyester and of the polyhydroxy compounds used as crosslinking agents, 0.9 to 1.1 equivalents of isocyanate groups of the diisocyanate are employed.

The subject of the present invention is thus a process for the manufacture of high molecular, crosslinked, crystalline polyadducts possessing urethane groups, which is characterized in that (a) linear polyesters possessing terminal hydroxyl groups, of average formula

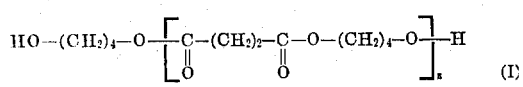 (I)

wherein z denotes a number having a value of at least 4 and at most 30, (b) as crosslinking agents, polyhydroxyl compounds containing at least 3 alcoholic hydroxyl groups and in particular preferably those having a hydroxyl equivalent weight of at most 300 and (c) diisocyanates, are reacted with warming to form a polyadduct, using in each case 0.9 to 1.1 equivalents of isocyanate groups of the diisocyanate (c) per 1 equivalent of the total amount of hydroxyl groups of the two components (a) and (b), with the mutual ratio of components (a) and (b) being so chosen that 1 equivalent of the total amount of hydroxyl groups is composed of 0.95 – 0.50, preferably 0.9 – 0.7, equivalent of hydroxyl groups of the succinic acid-butane-1,4-diol polyester (a) and of 0.05 to 0.5, preferably 0.1 to 0.3, equivalent of hydroxyl groups of the crosslinking polyhydroxyl compound (b).

The manufacture of the linear succinic acid-butane-1,4-diol polyester (a) possessing hydroxyl end groups can take place in accordance with the following equation:

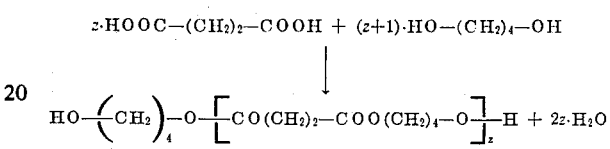

Instead of succinic acid, it is also possible to use succinic anhydride in accordance with the following equation:

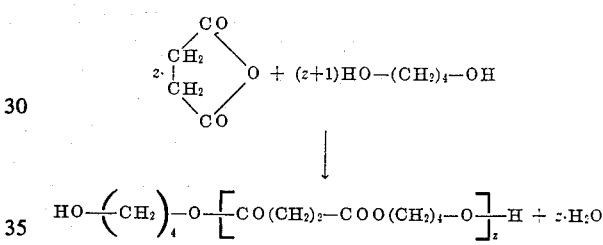

In order to manufacture these polyesters, the starting substances are mixed and heated, in the melt process, under a nitrogen atmosphere, to 150°–160°C, until the calculated hydroxyl equivalent weight is reached and the acid equivalent weight is not less than 4,000, but advantageously higher.

The succinic acid-butane-1,4-diol polyesters of formula (I) possess an average molecular weight of about 750 to about 5,300. The products so obtained still contain slight proportions of polyesters having both terminal hydroxyl groups and also terminal carboxyl groups.

A small proportion of another dicarboxylic acid, such as for example glutaric acid or adipic acid, and/or of another diol, such as propanediol or hexanediol, can also be incorporated in the polyester, but the technical properties of these polyurethane plastics are as a rule worsened, or their crystallization transition temperature lowered, by such a modification.

Possible crosslinking agents (b) which possess at least three alcoholic hydroxyl groups are above all aliphatic or cycloaliphatic polyalcohols having three to six hydroxyl groups, such as for example glycerine, 1,1,1-trimethylolpropane, 1,1,1-tri-methylolethane, hexane-1,2,6-triol, hexane-2,4,6-triol, butane-1,2,4-triol, 3-hydroxymethyl-2,4-dihydroxy-pentane, pentaerythritol, mannitol, sorbitol, 3,4,8-trihydroxy-tetrahydro-dicyclopentadiene ( = tricyclo-(5.2.1.0$^{2,6}$)-decane-3,4,8-triol); and also of polyethers which are manufactured by reaction of the trihydroxy, tetrahydroxy, pentahydroxy or hexahydroxy compounds quoted above with a monoepoxide, such as ethylene oxide, propylene oxide, butylene oxide, isobutylene oxide, styrene oxide, phenyl glycidyl ether or cresyl glycidyl ether or mixtures of such monoepoxides, or by the successive action of two or more of such monoepoxides. Furthermore, there may be mentioned the addition products of monoepoxides, especially alkylene oxides such as ethylene oxide or propylene oxide, to other polyfunctional starting molecules containing at least 3 active H-atoms; such polyfunctional compounds are, apart from the polyalcohols, above all tricarboxylic and tetracarboxylic acids, such as trimellitic acid, trimesic acid, aconitic acid, citric acid, tricarballylic acid and pyromellitic acid; and also polyphenols, such as phloroglucinol, methylolated monophenols or polyphenols, such as trimethylolphenol, and cyclic nitrogen compounds such as cyanuric acid or isocyanuric acid.

Optimum technical properties of the crystalline polyurethane plastics are achieved with crosslinking agents (b) which have a hydroxyl equivalent weight of not greater than 300, preferably not greater than 100.

Such preferred crosslinking agents are above all low molecular trihydric saturated aliphatic alcohols, such as glycerine or hexanetriols, and also addition products of an average of 1 to 3 mols of a monoepoxide, such as ethylene oxide, propylene oxide or styrene oxide, to such triols.

As diisocyanates (c), aliphatic, cycloaliphatic or araliphatic diisocyanates are preferably used. These compounds possess a lower reaction speed than the aromatic diisocyanates and are therefore particularly suitable for use as casting resins, since in this type of use longer processing times are in part required.

The following aliphatic, cycloaliphatic or araliphatic diisocyanates can be employed: ethylene-diisocyanate, trimethylene-diisocyanate, tetramethylene-diisocyanate, hexamethylene-diisocyanate, decamethylene-diisocyanate, 2,2,4- and 2,4,4-trimethylhexamethylene-diisocyanate or their technical mixtures; 1,4- or 1,3-cyclohexylene-diisocyanate, 2,4- or 2,6-hexahydrotoluylene-diisocyanate, 3,3,5-trimethyl-3-(isocyanato-methyl)-cyclohexane-isocyanate-(1) ( = isophorone-diisocyanate), 4,4'-dicyclohexyl-methane-diisocyanate; diisocyanates of formula $$OCN-X-NCO$$

wherein X denotes the hydrocarbon residue of an optionally hydrogenated dimerized unsaturated fatty alcohol; o-, m- and p-xylylene-diisocyanate.

In application processes with relatively short processing times aromatic diisocyanates can also be used with good success, such as for example 2,4-toluylene-diisocyanate, 2,6-toluylene-diisocyanate or their technical mixtures; 4,4'-diphenylmethane-diisocyanate, 1,5-naphthalene-diisocyanate, 3,3'-dimethyldiphenyl-4,4'-diisocyanate, 4,4'-diphenyldimethylmethane-diisocyanate, 3,3'-dichloro-diphenyl-4,4'-diisocyanate, 4,4'-diphenyl-diisocyanate, 3,3'-dimethoxy-4,4'-diisocyanato-diphenyl, p,p'-dibenzyl-diisocyanate, 1,4-phenylene-diisocyanate, 1,3-phenylene-diisocyanate, 2,3,5,6-tetramethyl-p-phenylene-diisocyanate, the uretdione-diisocyanates obtainable by dimerization of aromatic diisocyanates, such as for example 2,4-toluylene-diisocyanate, for example 1,3-bis-(4'-methyl-3'-isocyanato-phenyl)-uretdione of formula

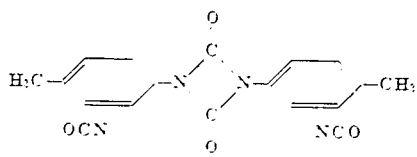

and N,N'-di(4-methyl-3-isocyanato-phenyl)-urea.

Furthermore, the following diisocyanates can be employed:

The addition products of 2 mols of 2,4-toluylene-diisocyanate to 1 mol of a glycol, such as are treated by E. Müller in Houben-Weyl, 4th. edition, volume XIV/2, on pages 66 and 71–72; furthermore, the corresponding addition products of 2 mols of "isophorone-diisocyanate" to 1 mol of a glycol.

The reaction components a, b and c which are employed are advantageously added in as pure a form as possible. The polyaddition reaction can also be carried out in the presence of accelerators; this is however not absolutely necessary. Possible catalysts are especially tertiary amines, such as pyridine, N,N'-dimethyl-piperazine, N,N-dimethylbenzylamine, tributylamine, triethylamine, N-methylmorpholine, N-methyl-pyrrole, N-methylpyrrolidine, diaza-(2.2.2)-bicyclooctane or diethyl-2-hydroxyethyl-amine, and also metal salts, such as $FeCl_3$, $AlCl_3$, $ZnCl_2$, $SnCl_2$, tin''-isooctoate, lead octoate, lead naphthenate and the dilaurate of tin-dibutyl. A survey of the most customary catalysts is furthermore to be found in Houben-Weyl, 4th. edition, volume XIV/2 on page 61 (review by E. Müller).

As a rule the polyaddition reaction or crosslinking (curing) is carried out in the temperature range of 80°–180°C, advantageously between 100° and 150°C.

In order to manufacture rigid foams it is furthermore possible conjointly to use, in a manner which is in itself known, blowing agents and surface-active substances, such as for example silicon compounds, as foam stabilizers. Because of the relatively high processing temperatures possible blowing agents are above all substances which split off carbon dioxide or nitrogen at elevated temperature. Such substances are for example compounds containing carboxyl groups which on warming react with isocyanate groups to split off $CO_2$.

The manufacture according to the invention of crystalline polyurethane plastic products is as a rule carried out with simultaneous shaping to give castings, foamed articles, mouldings, lacquer films, laminates, adhesive bonds and the like. The procedure followed is that a mixture of the polyester (a), the polyhydroxyl compound (b) and the diisocyanate (c) together with the optionally conjointly used catalyst and/or blowing agent, foam stabilizer and the like is manufactured and that this mixture is then, after introduction into casting moulds or compression moulds, spreading as coatings, introduction into adhesive joints and the like, allowed to react fully, with application of heat, to give the synthetic plastic.

A further subject of the present invention are therefore curable compositions which can, under the influence of heat, be converted into shaped articles or foamed articles including two-dimensional structures, such as coatings or adhesive joints, and which contain (a) a linear polyester, possessing terminal hydroxyl groups, from succinic acid and 1,4-butanediol, of formula (I), (b) a polyhydroxyl compound containing at least 3 alcoholic hydroxyl groups and in particular a compound of this kind having a hydroxyl equivalent weight not greater than 300, and (c) a diisocyanate, as well as, optionally, a curing catalyst and/or blowing agents and foam stabilizers. In such a case 0.9 to 1.1 equivalents of isocyanate groups of the diisocyanate (c) are in each case present per 1 equivalent of the total amount of hydroxyl groups, and furthermore 1 equivalent of the total amount of hydroxyl groups in the mixture is composed of 0.95 – 0.5, preferably 0.9 – 0.7, equivalent of hydroxyl groups of the polyester (a) and 0.05 to 0.5, preferably 0.1 to 0.3, equivalent of hydroxyl groups of the crosslinking polyhydroxyl compound (b).

The linear polyester possessing terminal hydroxyl groups, the diisocyanate, the polyhydroxyl compound having at least 3 hydroxyl groups which is conjointly used as a crosslinking agent, as well as optional additives, can be easily mixed at elevated temperature to give a melt of low to medium viscosity having a relatively long period of use or "pot life". A particular advantage of the new curable compositions resides in the low temperature rise and the slight shrinkage on conversion into the crystalline plastic. As a result of this property it is possible to cast even large articles rapidly and to cure them without significant internal stresses. Shaped articles from the crystalline plastic products manufactured according to the invention can be stretched at room temperature and after stretching are reversibly deformable up to relatively high stresses.

It is of course possible to add, to the curable compositions, further usual additives for polyisocyanate curable compositions, such as fillers, reinforcing agents, mould release agents, antioxidants, anti-ageing agents, light protection agents, ultraviolet absorbers, flameproofing substances, optical brighteners, dyestuffs or pigments.

Suitable fillers or reinforcing agents are fibrous or pulverulent inorganic or organic substances. Quartz powder, aluminum oxide trihydrate, mica, aluminum powder, iron powder, iron oxide, ground dolomite, chalk powder, gypsum, slate powder, unburnt kaolin (bolus), glass fibers, boron fibers, carbon fibers, asbestos fibers and especially fillers of high water absorbency, such as for example anhydrous silicon dioxide, silica aerogel, anhydrous aluminum oxide, active charcoal, zeolites, bentonites and burnt kaolin may be mentioned.

The curable compositions can furthermore serve, in the filled or unfilled condition, as dipping resins, casting resins, laminating resins, impregnating resins, coating agents, sealing compositions, potting and insulating compositions for the electrical industry, or as adhesives.

In addition to manual processing the mechanized processing methods for the manufacture of polyurethane plastics can with advantage be employed which permit continuous mixing of the diisocyanates (c) with the components (a) and (b) containing hydroxyl groups, to form a homogeneous melt. Thus the most diverse shaped articles (hard rubber substitute) can be manufactured by casting or centrifugal casting. Further applications exist in the field of casting compositions for pouring into joints or for sealing pipe couplings, and also as floor coverings or road coverings, as impression compositions or as adhesives. Unsupported foils, strips or filaments can be manufactured in a simple manner and impregnations or coatings of textiles, fiber materials (leather substitute) or paper can be carried out in a simple manner. The new curable compositions can, if the reaction speed is appropriately adjusted, for example be employed for lining containers or for the manufacture of endless tubes of any profile by means of continuously operating heated injection moulding machines. Rigid foams or hard foams manufactured from foamed compositions according to the invention are for example employed as insulating substances for buildings and refrigeration installations, as packaging materials and especially for shock absorption, for example as vibration-damping constructional components in the construction of automobiles and machinery.

In the examples which follow, unless otherwise indicated, percentages denote percentages by weight. The following polyesters containing hydroxyl groups were used for the manufacture of crystalline polyurethane plastics described in the examples:

POLYESTER A

One thousand one hundred eighty g (10 mols) of succinic acid were heated with 990 g (11 mols) of butane-1,4-diol for 7 hours to 140°–150°C and then for 2 hours to 190°C. Thereafter the mixture was heated for 21 hours to 170° – 190°C under a water pump vacuum, whereupon the resin showed an acid equivalent weight of 9,000. Thereafter 20 g of butane-1,4-diol were added, the mixture was allowed to continue to react for 18 hours at 175°C, and finally unreacted butanediol was distilled off under a water pump vacuum. A polyester was obtained which no longer showed an acid content and had the following characteristics: melting point = 106°C; hydroxyl equivalent weight = 935.

POLYESTER B

Two hundred eighty-one g of succinic acid and 250 g of 1,4-butanediol (corresponding to a ratio of 7 mols of butanediol to 6 mols of succinic acid) were warmed to 158°C under a nitrogen atmosphere. The mixture was further warmed to 190°C over the course of 7 hours while stirring, cooled to 150°C, subjected to a vacuum of 13 mm Hg, and again warmed to 190°C in vacuo over the course of 5 hours. The resulting polyester was a white crystalline mass at room temperature, having the following characteristics:

Melting point = 107°C; acid equivalent weight = 5450; hydroxyl equivalent weight = 807.

POLYESTER C

One hundred thirty-five g (1.5 mols) of butane-1,4-diol and 120 g (1.2 mols) of succinic anhydride were heated under a nitrogen atmosphere from 160°C to 180°C over the course of 2 hours and subsequently heated for 3 hours to 180°C, in the course of which 20 ml of water distilled off. Thereafter the mixture was left to cool to 160°C and again heated to 180°C under a waterpump vacuum over the course of 2 hours and left for 3 hours at 180°C. Hereupon a colorless crystalline polyester having the following characteristics is obtained: melting point = 100°C; acid equivalent weight = 5335; hydroxyl equivalent weight = 468.

POLYESTER D 473.0 g (5.25 mols) of butane-1,4-diol and 500.0 g (5.00 mols) of succinic anhydride (corresponding to a molar ratio of glycol to anhydride of 21 : 20) were mixed and fused under a nitrogen atmosphere in a sulphonation flask equipped with a stirrer, thermometer and descending condenser. Hereupon a slightly exothermic reaction occurred on heating to 130°C. After further increasing the reaction temperature, the elimination of water commenced and after 2 hours the reaction mixture reached a temperature of 160°C. It was subsequently left to react further at 160° – 165°C until the acid equivalent weight had exceeded a value of 6,000, which required 82 hours. The product is crystalline at room temperature and shows a crystallization transition temperature of 115°C. The acid equivalent weight is then 6,375 and the hydroxyl equivalent weight 1,725 (theory: 1766).

POLYESTER E 580.0 g (5.80 mols) of succinic anhydride and 556.2 g (6.18 mols + 3 percent excess) of butane-1,4-diol (corresponding to a molar ratio of glycol to anhydride of 30 : 29) were mixed and heated to 160°–165°C under a nitrogen atmosphere. After 24 hours' reaction time under normal conditions the mixture was allowed to react for a further 30 hours under a vacuum of 70 mm Hg. The amount of water eliminated then reached the theoretical value of 104 g. The crystalline polyester showed a melting point of 103°–104°C, an acid equivalent weight of 7470 and a hydroxyl equivalent weight of 2562 (theory 2539).

POLYESTERS I TO VI FOR COMPARISON EXPERIMENTS:

In order to manufacture these polyesters, the starting substances were mixed in the ratio of 10 mols of dicarboxylic acid to 11 mols of glycol and heated to 175°–185°C over the course of 13 hours under a nitrogen atmosphere. The mixture was subsequently allowed to react for a further 3 hours at 160°C under a waterpump vacuum. The resulting polyesters are crystalline colorless compounds. The measured hydroxyl equivalent weights and melting points of the polyesters I to VI are quoted below:

Polyester I = polyester of 10 mols of succinic acid and 11 mols of ethylene glycol; hydroxyl equivalent weight = 1040; melting point = 83°C (in the Differential Scanning Calorimeter a further, weaker maximum of the energy absorption can be detected at 75°C).

Polyester II = polyester of 10 mols of succinic acid and 11 mols of 1,6-hexanediol; hydroxyl equivalent weight = 1120; melting point = 48°C.

Polyester III = polyester of 10 mols of adipic acid and 11 mols of ethylene glycol; hydroxyl equivalent weight = 1622; melting point = 41°C.

Polyester IV = polyester of 10 mols of adipic acid and 11 mols of 1,4-butanediol; hydroxyl equivalent weight = 1100; melting point = 47°C.

Polyester V = polyester of 10 mols of succinic acid and 11 mols of 1,3-propanediol; hydroxyl equivalent weight = 830; melting point = 39°C (in the Differential Scanning Calorimeter a further, weaker maximum of the energy absorption can be detected at 28°C).

Polyester VI = polyester of 10 mols of glutaric acid and 11 mols of 1,3-propanediol; hydroxyl equivalent weight = 900; melting point = 46°C, (in the Differential Scanning Calorimeter a further, weaker maximum of the energy absorption can be detected at 30°C).

EXAMPLE 1 a. 935 g (= 0.94 equivalent) of polyester A were warmed to 100°C with 8.8. g of 3-hydroxymethyl-2,4-dihydroxypentane (= 0.2 equivalent) and subjected to a vacuum at 20 mm Hg for 20 minutes. Subsequently the mixture was warmed to 120°C and 134.4 g (= 1.2 equivalents) of 3,5,5-trimethyl-3-(isocyanatomethyl)-cyclohexane-isocyanate-(1) (= "isophorone-diisocyanate") were added, and the whole well mixed and again subjected to a brief vacuum treatment, at 110°C, in order to remove air bubbles and moisture. The mixture was poured into prewarmed moulds of an aluminum alloy (registered trade name "Anticorrodal") of internal dimensions 140 × 140 × 2 mm, which had been treated with a silicone release agent, and subjected to a heat treatment of 16 hours at 140°C. Test specimens corresponding to VSM 77,101 (revised) (test specimen No. 2) [corresponding to ISO Recommendation R 527, test specimen No. 2 and DIN 53,455, test specimen No. 2] were punched from the 2 mm thick sheets for the tensile test. VSM as used herein is the official abbreviation for "Verein Schweizerischer Maschinenindustrieller", an association which has issued test standards identified by numbers, similar to ASTM. The crystallization transition temperature was determined by means of a Differential Scanning Calorimeter ("DSC 1" of Messrs. Perkin Elmer) using a heating speed of 80°C per minute. On warming a resin at a uniform speed an intense absorption of energy by the resin occurs within a relatively small temperature range on melting the crystals. The temperature at which the energy absorption is greatest (maximum of the endothermic peak) is designated the crystallization transition temperature (CTT). The mouldings had the following properties:

Tensile strength according to VSM 77,101 = 3.5 kg/mm²
Elongation at break according to VSM 77,101 = 800 %
Tensile strength after prior stretching to 500% (VSM 77,101) (at 20°C) = 14.0 kg/mm²
Crystallization transition temperature = 97°C b. On using 6.14 g of glycerine (= 0.2 equivalent) instead of 0.2 equivalent of 3-hydroxymethyl-2,4-dihydroxypentane and otherwise the same composition and processing of the moulding composition as in example 1 a), mouldings with the following properties were obtained:

Tensile strength according to VSM 77,101 = 2.9 kg/mm²
Elongation at break according to VSM 77,101 = 440 percent
Tensile strength after prior stretching to 420 percent (VSM) = 14.7 kg/mm²
Elongation at break after prior stretching to 420 percent (VSM) (at 20°C) = 25 percent
Crystallization transition temperature = 97°C c. On using 6.8 g of pentaerythritol (= 0.2 equivalent) instead of 0.2 equivalent of 3-hydroxymethyl-2,4-dihydroxypentane and otherwise the same composition and processing of the moulding composition as in example 1 a mouldings with the following properties were obtained:

Tensile strength according to VSM 77,101 = 4.0 kg/mm²
Elongation at break according to VSM 77,101 = 450 percent
Tensile strength after stretching to 270 % (VSM) (at 20°C) = 13.7 kg/mm²
Elongation at break after stretching to 270 % (VSM) = 80 %
Crystallization transition temperature = 96°C d. On using 22 g (= 0.5 equivalent) of 3-hydroxymethyl-2,4-dihydroxypentane and 168 g (= 1.5 equivalents) of "isophorone-diisocyanate" instead of 0.2 or 1.2 equivalents, and otherwise the same composition and processing of the moulding composition as in example 1 a, mouldings having a crystallization transition temperature of 92°C were obtained.

EXAMPLE 2 a. 561 g (= 0.7 equivalent) of polyester B were warmed to 140°C with 13.2 g of 3-hydroxymethyl-2,4-dihydroxypentane (0.3 equivalent) were mixed with 131 g of hexamethylene-diisocyanate (= 1.56 equivalents). The mixture was well stirred, subjected to a vacuum at 95°C for 2 minutes in order to remove the bubbles, and poured into the prewarmed moulds according to example 1 a. After a heat treatment of 16 hours at 140°C mouldings with the following properties were obtained:

Tensile strength VSM (unstretched) = 3.6 kg/mm²
Tensile strength after prior stretching (at 95°C) = 5.8 kg/mm²
Crystallization transition temperature = 84°C b. On using the same stoichiometric amount of 2,4-toluylene-diisocyanate (136 g) instead of hexamethylene-diisocyanate and otherwise the same composition and processing of the moulding composition as in example 2 a, mouldings with the following properties were obtained:

Tensile strength (unstretched) according to VSM = 3.6 kg/mm²
Elongation at break (unstretched) according to VSM = 310 percent
Tensile strength after stretching to 250 percent (VSM) = 9.0 kg/mm²
Elongation at break after stretching to 250 percent (VSM) = 47 percent
Crystallization transition temperature = 84°C c. 1127 g (= 1.4 equivalents) of polyester B were warmed to 140°C with 13.2 g (= 0.3 equivalent) of 3-hydroxymethyl-2,4-dihydroxypentane and well mixed. 176 g (= 1.56 equivalents) of 3,5,5-trimethyl-3-(isocyanato-methyl)-cyclohexane-isocyanate-(1) (= isophorone-diisocyanate) were added to the warm mixture, and the whole was well mixed and subjected to a vacuum at 120°C for 5 minutes. The mixture was poured into prewarmed moulds according to example 1 a and subjected to a heat treatment of 16 hours at 140°C. Mouldings with the following properties were obtained:

Tensile strength (unstretched) according to VSM = 3.3 kg/mm²
Elongation at break (unstretched) according to VSM = 480 percent
Tensile strength after prior stretching at room temperature to 400 %, according to VSM = 12.2 kg/mm²
Elongation at break after prior stretching at room temperature to 400 percent. = 45 percent
Tensile strength after prior stretching at 95°C (according to VSM) = 12.2 kg/mm²
Elongation at break after prior stretching at 95°C (according to VSM) = 40 percent
Crystallization transition temperature = 97°C

EXAMPLE 3

Four hundred sixty-eight g (= 1.0 equivalent) of polyester C were warmed to 120°C with 13.2 g (= 0.3 equivalent) of 3-hydroxymethyl-2,4-dihydroxypentane and well mixed with 160 g (= 1.42 equivalents) of 3,5,5-trimethyl-3-isocyanato-methyl-cyclohexane-isocyanate-(1) (= isophorone-diisocyanate) and subjected to a vacuum for 5 minutes at 120°C. The mixture was poured into prewarmed moulds corresponding to example 1 a and subjected to a heat treatment of 16 hours at 140°C. After cooling, transparent, rubbery-elastic mouldings were obtained which only crystallized after some hours. The crystalline mouldings had the following properties:

Tensile strength (unstretched) (according to VSM) = 0.75 kg/mm²
Elongation at break (unstretched) (according to VSM) = 380 %
Tensile strength after stretching (according to VSM) to 300 percent at 20°C = 6.0 kg/mm²
Elongation at break after stretching (according to VSM) to 300 percent at 20°C = 100 percent
Crystallization transition temperature = 77°C

COMPARISON EXPERIMENT

Moulding compositions were manufactured by mixing polyesters I to VI with "isophorone-diisocyanate" and 3-hydroxymethyl-2,4-dihydroxypentane in exactly the same stoichiometric ratios as in example 1 a.

Mouldings were manufactured from the moulding compositions under identical reaction conditions as in example 1 a.

Table I below quotes the crystallization transition temperatures of the resulting mouldings and, by way of comparison, the CTT of a moulding according to the invention manufactured according to example 1 a with polyester A:

TABLE I

| | CH₂/O | CTT of the Moulding Material |
|---|---|---|
| Polyester A | 4 | 97°C. |
| Polyester I | 3 | 41°C. |
| Polyester II | 5 | 35°C. |
| Polyester III | 4 | 34°C. |
| Polyester IV | 5 | 41°C. |
| Polyester V | 3.5 | <20°C. |
| Polyester VI | 4 | <20°C. |

The values quoted in Table I show the surprisingly high crystallization transition temperature of the moulded materials according to the invention obtained with polyester A. Both an increase and a decrease in the ratio of the number of $CH_2$ groups to the number of oxygen bridges in the polyester chain, and also a change of the diol and dicarboxylic acid components of the polyester at a constant ratio of the number of $CH_2$ groups to the number of oxygen bridges in the polyester chain, result in a sharp lowering of the crystallization transition temperature.

EXAMPLE 4 a. 49.6 g of polyester A were warmed to 120°C with 27.3 g of a trihydroxy compound which had been obtained by addition of 6 mols of styrene oxide to 6 mols of glycerine in the presence of boron trifluoride-etherate as the catalyst (trihydroxy compound I), and the mixture was briefly subjected to a vacuum to remove air and moisture, mixed with 11.2 g of "isophorone-diisocyanate" (corresponding to 0.3 equivalent of trihydroxy compound I and 0.6 equivalent of hydroxyl of the polyester A per 1.0 equivalent of diisocyanate), and well stirred. The mixture was again subjected to a vacuum, poured into the moulds according to example 1 a, and subjected to a heat treatment of 3 hours at 140°C. Tough, crystalline mouldings were obtained, having a crystallization transition temperature of 103°C and a E-modulus of $2.6 \times 10^9$ dyn/cm² at 35 Hz and 22°C.

b. On using a trihydroxy compound which was obtained by addition of 9 mols of propylene oxide to 3 mols of 1,1,1-trihydroxymethylpropane in the presence of boron trifluoride-etherate as the catalyst (trihydroxy compound II), and otherwise the same composition and processing as in example 4 a, mouldings having a crystallization transition temperature of 103°C were obtained.

The trihydroxy compounds I and II used in examples 4 a and 4 b were manufactured as follows:

TRIHYDROXY COMPOUND I 552.0 g (6.0 mols) of freshly distilled glycerine were mixed with 1.5 ml of freshly distilled boron trifluoride-etherate and warmed to 60°C. 720.0 g (6.0 mols) of styrene oxide were then added dropwise over the course of 1 hour in such a way that, using temporary cooling with an ice bath, the temperature in the reaction mixture could always be kept at between 80° and 90°C by the exothermic reaction. After completion of the addition of styrene oxide, the mixture was allowed to continue reacting for 2½ hours at 90°C. The reaction mixture was then stirred into 1,800 ml of methanol and the entire solution was filtered over the course of 6 hours through 100 ml of basically charged ion exchanger (registered trade name DOWEX 1 × 8 of Messrs. The Dow Chemical Co.). The eluate was concentrated to constant weight on a rotary evaporator. 1142.0 g of crude product resulted as a light yellow-colored oil of low viscosity, having a hydroxyl equivalent weight of 91 (theory 71).

TRIHYDROXY COMPOUND II 1.5 ml of freshly distilled boron trifluoride-etherate were added to 402.0 g (3.0 mols) of 1,1,1-trihydroxymethylpropane and 522.0 g (9.0 mols) of pure propylene oxide were added dropwise over the course of 3 hours at 50°C, with temporary cooling. After completion of the addition an exothermic reaction could now be detected over the course of 30 minutes. Thereafter 200 ml of methanol and 31 g of basically charged ion exchanger (registered trade name DOWEX 1 × 8 of Messrs. The Dow Chemical Co.) were added to the reaction mixture and the whole stirred for 9 hours at room temperature, after which samples of the reaction mixture reacted neutral. After filtering and concentrating, 864.4 g of a light yellow product of low viscosity were obtained, having a hydroxyl equivalent weight of 119 (theory 103).

EXAMPLE 5

103.5 g of polyester D were warmed to 120°C with 28.8 g of a trihydroxy compound which had been obtained by addition of 4.5 mols of styrene oxide to 4.5 mols of 1,1,1-trihydroxymethylpropane in the presence of boron trifluoride-etherate as the catalyst (trihydroxy compound III), and the mixture was subjected to a vacuum for a short time to remove air bubbles and moisture and mixed with 20.9 g of a diisocyanate which had been obtained by addition of 4 mols of 2,4-toluylene-diisocyanate to 2 mols of ethylene glycol (diisocyanate I), (corresponding to 0.3 equivalent of trihydroxy compound III and 0.6 equivalent of hydroxyl of the polyester D per 1.0 equivalent of diisocyanate I). The mixture was again briefly subjected to a vacuum and poured into the moulds according to example 1 a. After a heat treatment of 3 hours at 140°C, crystalline mouldings of high toughness and having a crystallization transition temperature of 111°C were obtained.

The trihydroxy compound III used in example 5, as well as the diisocyanate I which was used, were manufactured as described below:

TRIHYDROXY COMPOUND III 1.5 ml of freshly distilled boron trifluoride-etherate were stirred into a melt of 603.0 g (4.5 mols) of 1,1,1-trihydroxymethylpropane. 540.0 g (4.5 mols) of styrene oxide were added dropwise to this solution at 85°–90°C over the course of 1 hour. After completion of the addition the mixture was stirred for a further 2½ hours at the same temperature. The reaction mixture was then taken up in 1,800 ml of methanol and the solution was allowed to run through a column of freshly charged basic ion exchanger (registered trade name DOWEX 1 × 8 of Messrs. The Dow Chemical Co.) over the course of 5 hours. After concentrating to constant weight, 1127.0 g of crude product resulted as a colorless oil of low viscosity, having a hydroxyl equivalent weight of 96 (theory 85).

DIISOCYANATE I 124.0 g (2.0 mols) of ethylene glycol were added dropwise over the course of 30 minutes to 696.0 g (4.0 mols) of 2,4-toluylene-diisocyanate in such a way that using moderate cooling the temperature in the reaction mixture was constantly kept at between 40° and 45°C by the exothermic reaction. The initially cloudy reaction mixture became homogeneous towards the end of the period of addition. After completion of the addition of ethylene glycol, yet a further temperature rise to 100°C took place, after which the product began to crystallize. The crude product showed a melting point of 111°–119°C and an isocyanate equivalent weight of 209 (theory 205) and was employed without further purification in the reaction described in example 5.

EXAMPLE 6

153.7 g of polyester E were warmed to 120°C with 28.8 g of the trihydroxy compound III described and used in example 5 and the whole mixed with 12.7 g of 4,4'-diphenylmethane-diisocyanate having an isocyanate equivalent weight of 127 (corresponding to 0.3 equivalent of trihydroxy compound III and 0.6 equivalent of hydroxyl of the polyester E per 1.0 equivalent of diisocyanate). The mixture was well stirred and immediately poured into the prewarmed mould according to example 1 a. After a heat treatment of 6 hours at 120°C relatively hard, crystalline mouldings having a crystallization transition temperature of 112°C were obtained.

We claim:

1. A thermocurable composition of matter characterized on curing by a crystallization transition temperature above about 80°C which comprises (a) a linear succinic acid or anhydride butane-1,4-diol polyester possessing terminal hydroxyl groups and having an average molecular size of from about 750 to about 5300, (b) 3-hydroxymethyl-2,4-dihydroxypentane and (c) a diisocyanate with 0.9 to 1.1 equivalents of isocyanate groups of the diisocyanate (c) being present in each case per 1 equivalent of the total amount of hydroxyl groups of the two components (a) and (b), and, further, with 1 equivalent of the total amount of hydroxyl groups being composed of 0.95 – 0.5 equivalents of hydroxyl groups of the polyesters (a) and 0.05 – 0.5 equivalents of hydroxyl groups of the 3-hydroxylmethyl-2,4-dihydroxypentane.

2. A composition as claimed in claim 1 which contains an aliphatic, cycloaliphatic or araliphatic diisocyanate as the diisocyanate (c).

3. A composition as claimed in claim 1 which contains hexamethylene-diisocyanate or 3,5,5-trimethyl-3-isocyanatomethyl-cyclohexane-isocyanate-(1) as the diisocyanate.

4. A composition as claimed in claim 1 which contains an aromatic diisocyanate as the diisocyanate.

5. A composition as claimed in claim 1 which contains 2,4-toluylene-diisocyanate or 2,6-toluylene-diisocyanate as the diisocyanate.

6. A composition as claimed in claim 1 which contains an addition product of 2 mols of a diisocyanate to 1 mol of a glycol as the diisocyanate.

7. A composition as claimed in claim 1 which contains the addition product of 2 mols of 2,4-toluylene-diisocyanate to 1 mol of ethylene glycol as the diisocyanate.

8. A thermocurable composition of matter characterized on curing by a crystallization transition temperature above about 80°C which comprises (a) a linear succinic acid or anhydride butane-1,4-diol polyester possessing terminal hydroxyl groups and having an average molecular size of from about 750 to about 5,300, (b) an addition product of 1 mol of glycerine to 1 mol of styrene oxide and (c) a diisocyanate with 0.9 to 1.1 equivalents of isocyanate groups of the diisocyanate (c) being present in each case per 1 equivalent of the total amount of hydroxyl groups of the two components (a) and (b), and, further, with 1 equivalent of the total amount of hydroxyl groups being composed of 0.95 – 0.5 equivalents of hydroxyl groups of the polyesters (a) and 0.05 to 0.5 equivalents of hydroxyl groups of the polyhydroxyl compound (b).

9. A thermocurable composition of matter characterized on curing by a crystallization transition temperature above about 80°C which comprises (a) a linear succinic acid or anhydride butane-1,4-diol polyester possessing terminal hydroxyl groups and having an average molecular size of from about 750 to about 5,300, (b) an addition product of 1 mol of 1,1,1-trihydroxymethylpropane to 3 mols of propylene oxide, and (c) a diisocyanate with 0.9 to 1.1 equivalents of isocyanate groups of the diisocyanate (c) being present in each case per 1 equivalent of the total amount of hydroxyl groups of the two components (a) and (b), and, further, with 1 equivalent of the total amount of hydroxyl groups being composed of 0.95 – 0.5 equivalents of hydroxyl groups of the polyesters (a) and 0.05 to 0.5 equivalents of hydroxyl groups of the polyhydroxyl compound (b).

10. A thermocurable composition of matter characterized on curing by a crystallization transition temperature above about 80°C which comprises (a) a linear succinic acid or anhydride butane-1,4-diol polyester possessing terminal hydroxyl groups and having an average molecular size of from about 750 to about 5,300, (b) an addition product of 1 mol of 1,1,1-trihydroxymethylpropane to 1 mol of styrene oxide and (c) a diisocyanate with 0.9 to 1.1 equivalents of isocyanate groups of the diisocyanate (c) being present in each case per 1 equivalent of the total amount of hydroxyl groups of the two components (a) and (b), and, further, with 1 equivalent of the total amount of hydroxyl groups being composed of 0.95 – 0.5 equivalents of hydroxyl groups of the polyesters (a) and 0.05 to 0.5 equivalents of hydroxyl groups of the polyhydroxyl compound (b).

11. A thermocurable composition of matter characterized on curing by a crystallization transition temperature above about 80°C which comprises (a) a linear succinic acid or anhydride butane-1,4-diol polyester possessing terminal hydroxyl groups and having an average molecular size of from about 750 to about 5,300, (b) glycerine or pentaerythritol and (c) a diisocyanate with 0.9 to 1.1 equivalents of isocyanate groups of the diisocyanate (c) being present in each case per 1 equivalent of the total amount of hydroxyl groups of the two components (a) and (b), and, further, with 1 equivalent of the total amount of hydroxyl groups being composed of 0.95 – 0.5 equivalents of hydroxyl groups of the polyesters (a) and 0.05 to 0.5 equivalents of hydroxyl groups of the polyhydroxyl compound (b).

* * * * *

PO-1050
(5/69)

UNITED STATES PATENT OFFICE
CERTIFICATE OF CORRECTION

Patent No. 3,674,746          Dated July 4, 1972

Inventor(s) FRIEDRICH LOHSE ET AL

It is certified that error appears in the above-identified patent and that said Letters Patent are hereby corrected as shown below:

Column 1, under "[73]", delete "CIBA Limited" and substitute --- CIBA-GEIGY AG ---.

Signed and sealed this 30th day of April 1974.

(SEAL)
Attest:

EDWARD M.FLETCHER,JR.            C. MARSHALL DANN
Attesting Officer                 Commissioner of Patents